United States Patent Office 3,623,849
Patented Nov. 30, 1971

3,623,849
SINTERED REFRACTORY ARTICLES
OF MANUFACTURE
John Stanwood Benjamin, Suffern, N.Y., assignor to The
International Nickel Company, Inc., New York, N.Y.
Continuation-in-part of application Ser. No. 709,700,
Mar. 1, 1968. This application Aug. 25, 1969, Ser.
No. 852,816
Int. Cl. C22c 29/00; B22f 9/00
U.S. Cl. 29—182.8                              8 Claims

ABSTRACT OF THE DISCLOSURE

This invention relates to the powder metallurgy of sintered refractory compound materials and also to a method for producing such materials, for example, cemented refractory carbides, characterized metallographically by a uniform dispersion of finely divided refractory compound particles throughout a metal matrix.

---

Figure 1:
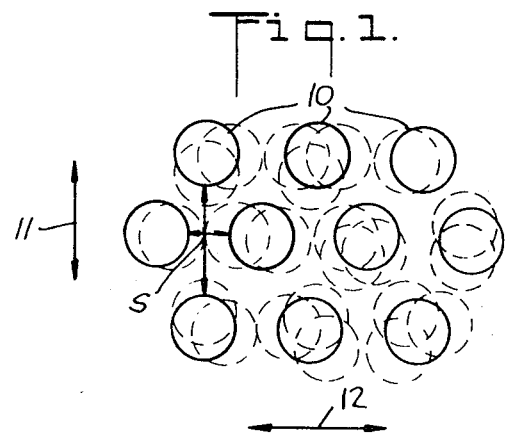

This application is a continuation-in-part of U.S. application Ser. No. 709,700, filed Mar. 1, 1968, which is now U.S. Pat. No. 3,591,362, issued July 6, 1971.

THE RELATED APPLICATION

In the aforementioned related application, Ser. No. 709,700, which is incorporated herein by reference, a method is disclosed for producing a wrought composite metal powder comprised of a plurality of constituents mechanically alloyed together, at least one of which is a metal capable of being compressively deformed such that substantially each of the particles is characterized metallographically by an internal structure comprised of the starting constituents intimately united together and identifiably mutually interdispersed. One embodiment of a method for producing the composite powder resides in providing a dry charge of attritive elements and a powder mass comprising a plurality of constituents, at least one of which is a metal which is capable of being compressively deformed. The charge is subjected to agitation milling under high energy conditions in which a substantial portion or cross section of the charge is maintained kinetically in a highly activated state of relative motion and the milling continued to produce wrought composite metal powder particles of substantially the same composition as the starting mixture characterized metallographically by an internal structure in which the constituents are identifiable and substantially mutually interdispersed within substantially each of the particles. The internal uniformity of the particles is dependent on the milling time employed. By using suitable milling times, the interparticle spacing of the constituents within the particles can be made very small so that when the particles are heated to an elevated diffusion temperature, interdiffusion of diffusible constituents making up the matrix of the particle is effected quite rapidly.

Tests have indicated that the foregoing method enables the production of metal systems in which insoluble nonmetallics such as refractory oxides, carbides, nitrides, silicides, and the like, can be uniformly dispersed throughout the metal particle. In addition, it is possible to interdisperse alloying ingredients within the particle in addition to the compressvely deformable metal, particularly such alloying ingredients as chromium which has a propensity of oxidizing easily due to its rather high free energy of formation of the metal oxide. In this connection, mechanically alloyed particles can be produced by the foregoing method containing any of the metals normally difficult to alloy with another metal, and even those metals which wet with difficulty certain of the refractory compounds, such as refractory oxides.

THE PRIOR ART

Sintered refractory compound materials, such as sintered refractory carbides, otherwise known as cemented carbides, are produced by employing powder metallurgy techniques. The refractory carbides, such as tungsten carbide in the form of finely divided particles, are sintered with one or more metals of the iron group (iron, nickel or cobalt) to form a body of high hardness and compressive strength. The tungsten carbide may be combined with lesser amounts of other carbides, such as titanium carbide and/or tantalum carbide. The sintered carbide body is formed by blending together finely divided refractory carbide, e.g., tungsten carbide, with a finely divided matrix-forming binding metal, such as cobalt, the mixed powders then pressed into a compact at a pressure, for example, of 8 t.s.i. (tons per square inch), and the pressed compact finally heated in vacuum or in a reducing atmosphere of dry hydrogen to an elevated liquid phase sintering temperature (such as just above the melting point of the cobalt-tungsten carbide eutectic) for a time sufficient to assure densification, and the compact then cooled to room temperature.

After solidification of the binder metal cobalt, it is present in the interstices as almost pure metal with its original ductility. Solid cobalt dissolves only about 1% tungsten carbide at ambient temperatures and, because of this, cobalt provides a tough matrix and is, therefore, more desirable over its sister iron group metals, iron and nickel. Iron and nickel dissolve more tungsten carbide and thus the metal matrix is not as ductile as cobalt.

In preparing a powder blend of tungsten carbide, cobalt and an organic wax binder for pressing, a mixture is ball milled for upwards of about 60 hours in a protective fluid, such as hexane, containing stainless steel balls. During the milling, part of the cobalt powder is smeared onto the surface of the carbide particles as a very thin coating. Upon completion of the milling, the fluid is separated from the blended powder which is dried prior to pressing into the desired shape for sintering.

By employing the foregoing method, a wide variety of refractory carbide compositions can be formulated, depending upon the ultimate use. A chief use is in cutting tools. Another use is in the production of inserts for oil drilling bits. A still further use is in the manufacture of abrasion resistant tools. Another use is in slush nozzles for jet-type rock bits. Still another use, depending upon composition, is as high temperature elements requiring resistance to oxidation, and also dies.

With regard to sintered refractory carbide elements, it is known that microstructure has an influence on hardness and strength. For example, the size of the carbide grains in the matrix, their distribution, the porosity and the quality of the bond between the binder metal and the carbide grains are factors which influence the physical properties of the sintered product. Increasing the size of tungsten carbide grains has a tendency of lowering the ultimate hardness in that lakes or regions of cobalt are formed which are also larger than the starting powder. Thus, the ideal structure of high strength carbide is one where the carbide or refractory compound is very small and where the average interparticle spacing is uniform and small, such as below 1 micron and below even 0.5 micron with the binder surrounding substantially each grain as the matrix.

Generally speaking, the average particle size of refractory carbides range from about 2 to about 10 microns. It will be desirable to provide a method for producing sintered refractory compound materials, such as refractory carbides, in which the hard phase can be made as small as possible during processing regardless of the starting size of the refractory compound powder combined with a high degree of uniformity of dispersion of the hard phase.

It is thus the object of the invention to provide an improved powder metallurgy method for producing sintered refractory compound material, such as refractory carbides.

Another object is to provide a powder metallurgy method for producing a sintered refractory compound product characterized metallographically by optimum dispersion uniformity of the refractory compound material in a highly finely divided state.

A further object is to provide a sintered refractory compound product in which the refractory compound grains are finely divided and uniformly dispersed throughout the metal matrix.

Figure 2:
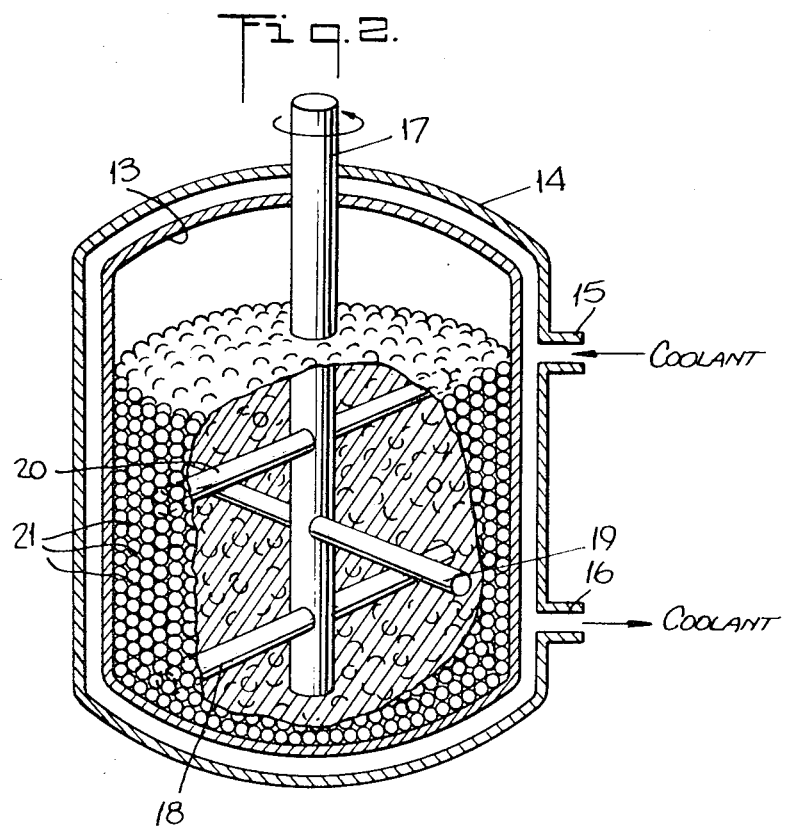

These and other objects will more clearly appear when taken in conjunction with the following description and the accompanying drawing, wherein:

FIG. 1 depicts schematically a portion of a ball charge in a kinetic state of random collision; and FIG. 2 is a schematic representation of an attritor of the stirred ball mill type capable of providing agitation milling to produce composite metal particles as the starting material for use in carrying out the invention.

STATEMENT OF THE INVENTION

Stating it broadly, one aspect of the present invention resides in a method for producing a sintered article of manufacture comprising a hard refractory compound, such as a refractory carbide, dispersed through a metal matrix. The method comprises providing a batch of wrought, composite, mechanically alloyed dense particles, substantially each of said particles being comprised of a plurality of constituents, at least one of which is a hard refractory compound (hard phase) making up at least about 24% by volume of the total composition and at least one other constituent which is a compressively deformable matrix-forming binding metal making up at least about 15 volume % of the total composition, substantially each of the composite particles being characterized by an internal structure comprising the constituents intimately united and interdispersed, and then sintering a consolidated mass of the composite particles at an elevated sintering temperature, whereby to produce a sintered product in which the hard phase is finely and intimately dispersed throughout the metal matrix.

Products according to the invention are regarded as substantially free from stringers or segregation if it contains less than 10 volume percent of stringers or of regions exceeding 3 microns in minimum dimension in which there is a significant composition fluctuation from the mean, that is to say, a deviation in composition exceeding 10% of the mean content of the segregated alloying element. The boundaries of a segregated region are taken to lie where the composition deviation from the mean is one-half of the maximum deviation in that region. Preferably, the minimum dimension of the region of compositional fluctuation does not exceed 2 microns or 1 micron or even 0.5 micron. Preferably also, the proportion of segregated regions is less than 5 volume percent. Compositional variations on the scale discussed above may, for example, be detected and measured by electron microprobe examination.

The sintering of the consolidated mass may be carried out several ways. For example, the batch of composite particles can be sintered while simultaneously undergoing hot pressing at an elevated sintering temperature; or, the batch of composite particles can be first consolidated either cold or hot to a particular green density, e.g., 60% to 70% of true density, and the consolidated mass thereafter sintered at an elevated temperature under non-oxidizing conditions, such as in a vacuum or under a neutral or reducing atmosphere, e.g., dry argon or dry hydrogen. Or, further still, a batch of composite particles containing a substantial amount of matrix-forming metal, e.g., 40, 50, 60 or 70% by volume of matrix-forming binding metal, may be vacuum sealed in a nickel can or other suitable metal container, and the whole extruded at an elevated temperature at which sintering occurs during consolidation and extrusion. Thus, the expression "sintering a consolidated mass of the composite particles" used hereinabove is meant to cover the foregoing methods or any other methods in which sintering of the composite particles is achieved just before, during or after consolidation of the powder, no matter what form the sintering takes. The advantages of the invention accrue from the use of the wrought composite metal particles to be discussed below.

By employing wrought, composite particles having a highly uniform dispersion of hard phase, a consolidated product is assured characterized by a high degree of dispersion uniformity of the hard phase throughout the product in both the longitudinal and transverse cross sections and, particularly, in any selected area when viewed in magnification of up to 10,000 times or more. In other words, by starting with the foregoing composite particles as the building blocks in producing the wrought metal shape, the high degree of uniformity of each of the composite particles is carried forward and maintained in the final product.

The wrought, composite metal particles which are employed in the starting material are defined in copending application Ser. No. 709,700 as being made by integrating together into dense particles a plurality of constituents in the form of powders, at least one of which is a compressively deformable metal. The requirement of deformable metal is fulfilled by the binder metal since it constitutes essentially the balance of the sintered composition. In one method, the constituents are intimately united together to form a mechanical alloy within individual particles without melting any one or more of the constituents. Thus, the formation of carbide segregates, lakes of binder metal in the finally sintered product, is greatly inhibited. By the term "mechanical alloy" is meant that state which prevails in a composite metal particle wherein a plurality of constituents in the form of powders, at least one of which is a compressively deformable metal, are caused to be bonded or united together, according to one method, by the application of mechanical energy in the form of a plurality of repeatedly applied compressive forces sufficient to vigorously work and deform at least one deformable metal and cause it to bond or weld to itself and/or to the remaining constituents, be they metals and/or non-metals, whereby the constituents are intimately united together and identifiably codisseminated throughout the internal structure of the resulting composite metal particles.

The process employed for producing mechanically alloyed particles containing a uniform dispersion of hard phase (refractory compound) comprises providing a mixture of a plurality of powdered constituents, at least one of which is a compressively deformable metal, and at least one other constituent is a refractory compound, such as a refractory metal carbide, with or without another chemically distinct metal, and subjecting the mixture to the repeated application of compressive forces, for example, by agitation milling under dry conditions in the presence of attritive elements maintained kinetically in a highly activated state of relative motion, and continuing the dry milling for a time sufficient to cause the constituents to comminute and bond or weld together. By repeated fracture and rewelding together of said composite particles, a fine codissemination of the fragments of the various constituents throughout the internal structure of each particle is achieved. Concurrently, the overall particle size distribution of the composite particles remains substantially constant throughout the processing. The mechanical alloy produced in this manner is characterized metallographically by a cohesive internal structure in which the constituents are intimately united to provide an interdispersion of comminuted fragments of the starting constituents. Generally, the particles are produced in a heavily cold worked condition and exhibit a microstructure characterized by closely spaced fragments. This type of milling differs from that employed conventionally in producing cemented carbides of WC-Co in that, in the conventional method, cobalt is merely smeared on as a coating.

It has been found particularly advantageous in obtaining optimum results to employ agitation milling under high energy conditions in which a substantial portion of the mass of the attritive elements is maintained kinetically in a highly activated state of relative motion. However, the milling need not be limited to such conditions so long as the milling is sufficiently energetic to reduce the thickness of the initial metal constituents to less than one-half of the original thickness and, more advantageously, to less than 25% of the average initial particle diameter thereof by impact compression resulting from collisions with the milling medium, e.g., grinding balls.

As will be appreciated, in processing powder in accordance with the invention, countless numbers of individual particles are involved. Similarly, usual practice requires a bed of grinding media containing a large number of individual grinding members, e.g., balls. Since the particles to be contacted must be available at the collision site between grinding balls or between grinding balls and the wall of the mill or container, the process is statistical and time dependent.

By the term "agitation milling," or "high energy milling" is meant that condition which is developed in the mill when sufficient mechanical energy is applied to the total charge such that a substantial portion of the attritive elements, e.g., ball elements, are continuously and kinetically maintained in a state of relative motion with each other; that is to say, maintained kinetically activated in random motion so that a substantial number of elements repeatedly collide with one another. It has been found advantageous that at least about 40%, e.g., 50% or 70% or even 90% or more, of the attritive elements should be maintained in a highly activated state.

Since generally the composite metal particles produced in accordance with the invention exhibit an increase in hardness with milling time, it has been found that, for purposes of this invention, the requirements of high energy milling are met when a powder system of carbonyl nickel powder mixed with 2.5 volume percent of thoria is milled to provide within 100 hours of milling and, more advantageously, within 24 hours, a composite metal powder whose hardness increase with time is at least about 50% of substantially the maximum hardness increase capable of being achieved by the milling. Putting it another way, high energy milling is that condition which will achieve in the foregoing powder system an increase in hardness of at least about one-half of the difference between the ultimate saturated hardness of the composite metal particle and its base hardness, the base hardness being that hardness determined by extrapolating to zero milling time a plot of hardness data obtained as a function of time up to the time necessary to achieve substantially maximum or saturation hardness. The resulting composite nickel-thoria particles should have an average particle size greater than 3 microns and, more advantageously, greater than 10 microns, with preferably no more than 10%, by weight, of the product powder less than one micron.

By maintaining the attritive elements in a highly activated state of mutual collision in a substantially dry environment and throughout substantially the whole mass, optimum conditions are provided for comminuting and cold welding the constituents accompanied by particle growth, particularly with reference to the finer particles in the mix, to produce a mechanically alloyed structure of the constituents within substantially each particle. Where at least one of the compressively deformable metallic constituents has an absolute melting point substantially above about 1000° K., the resulting composite metal powder will be heavily cold worked due to impact compression of the particles arising from the repeated collision of elements upon the metal particles. For optimum results, an amount of cold work found particularly useful is that beyond which further milling does not further increase the hardness, this hardness level having been referred to hereinbefore as "saturation hardness."

This saturation hardness is typically far in excess of that obtainable in bulk metals of the same composition by such conventional working techniques as cold forging, cold rolling, etc. The saturation hardness achieved in pure nickel processed in accordance with this invention is about 477 kg./mm.$^2$ as measured by a Vicker's microhardness tester, while the maximum hardness obtainable by conventional cold working of bulk nickel is 250 kg./mm.$^2$. The values of saturation hardness obtained in processing alloy powders in accordance with this invention frequently reach values between 750 and 850 kg./mm.$^2$ as measured by Vicker's microhardness techniques. Those skilled in the art will recognize the amazing magnitude of these figures. The saturation hardness obtained in powders processed in accordance with this invention is also far in excess of the values obtained in any other process for mixing metal powders.

As illustrative of one type of attritive condition, reference is made to FIG. 1 which shows a batch of ball elements 10 in a highly activated state of random momentum by virtue of mechanical energy applied multidirectionally as shown by arrows 11 and 12, the transitory state of the balls being shown in dotted circles. Such a condition can be simulated in a vibratory mill. Another mill is a high speed shaker mill oscillated at rates of up to 1200 cycles or more per minute wherein attritive elements are accelerated to velocities of up to about 300 centimeters per second (cm./sec.).

A mill found particularly advantageous for carrying out the invention is a stirred ball mill attritor comprising an axially vertical stationary cylinder having a rotatable agitator shaft located coaxially of the mill with spaced agitator arms extending substantially horizontally from the shaft. A mill of this type is described in the Szegvari U.S. Pat. No. 2,764,359 and in Perry's Chemical Engineer's Handbook, fourth edition, 1963, at page 8–26. A schematic representation of this mill is illustrated in FIG. 2 of the drawing which shows in partial section an upstanding cylinder 13 surrounded by a cooling jacket 14 having inlet and outlet ports 15 and 16, respectively, for circulating a coolant, such as water. A shaft 17 is coaxially supported within the cylinder by means not shown and has horizontal extending arms 18, 19 and 20 integral therewith. The mill is filled with attritive elements, e.g., balls 21, sufficient to bury at least some of the arms so that, when the shaft is rotated, the ball charge, by virtue of the agitating arms passing through it, is maintained in a continual state of unrest or relative motion throughout the bulk thereof.

The dry milling process of the invention is statistical and time dependent as well as energy input dependent, and milling is advantageously conducted for a time sufficient to secure a substantially steady state between the particle growth and particle comminution factors. If the specific energy input rate in the milling device is not sufficient, such as prevails in conventional ball milling practice for periods up to 24 or 36 hours, a compressively deformable powder will generally not change in apparent particle size. It is accordingly to be appreciated that the energy input level should advantageously exceed that required to achieve particle growth, for example, by a factor of 5, 10 or 25, such as described for the attritor mill hereinbefore. In such circumstances, the ratio of the grinding medium diameter to the average particle diameter is large, e.g., 20 or 50 times or more. Thus, using as a reference a mixture of carbonyl nickel powder having a Fisher subsieve size of about 2 to 7 microns mixed with about 2.5% by volume of less than 0.1 micron thoria powder, the energy level in dry milling in the attritor mill, e.g., in air, should be sufficient to provide a maximum particle size in less than 24 hours. A mill of the attritor type with rotating agitator arms and having a capacity of holding one gallon volume of carbonyl nickel balls of plus ¼ inch and minus ½ inch diameter with a ball-to-powder volume ratio of about 20:1, and with the impeller driven at a speed of about 180 revolutions per minute (r.p.m.) in air, will provide the required energy level.

The milling time $t$ required to produce a satisfactory dispersion; the agtitator speed W (in r.p.m.); the radius, $r$, of the cylinder (in cm.) and the volume ratio R of balls to powder are related by the expression:

$$1/t = KW^3r^2R$$

where K is a constant depending upon the system involved. Thus, once a set of satisfactory conditions has been established in one mill of this type, other sets of satisfactory conditions for this and other similar mills may be predicted by use of the foregoing expression. When dry milled under these energy conditions without replacement of the air atmosphere, the average particle size of the reference powder mixture will increase to an average particle size of between about 100 to 125 microns in about 24 hours.

Attritor mills, vibratory ball mills, planetary ball mills, and some ball mills depending upon the ball-to-powder ratio and mill size, are capable of providing energy input within a time period and at a level required in accordance with the invention. In mills containing grinding media, it is preferred to employ metal or cermet elements or balls, e.g., steel, stainles steel, nickel, tungsten carbide, etc., of relatively small diameter and of essentially the same size. The volume of the powders being milled should be substantially less than the dynamic interstitial volume between the attritive elements, e.g., the balls, when the attritive elements are in an activated state of relative motion. Thus, referring to FIG. 1, the dynamic interstitial volume is defined as the sum of the average volumetric spaces S between the balls while they are in motion, the space between the attritive elements or balls being sufficient to allow the attritive elements to reach sufficient momentum before colliding. In carrying out the invention, the volume ratio of attritive elements to the powder should advantageously be over about 4:1 and, more advantageously, at least about 10:1, so long as the volume of powder does not exceed about one-quarter of the dynamic interstitial volume between the attritive elements. It is preferred in practice to employ a volume ratio of about 12:1 to 50:1.

The deformable metals in the mixture are thus subjected to a continual kneading action by virtue of impact compression imparted by the grinding elements, during which individual metal components making up the starting powder mixture become comminuted and fragments thereof are intimately united together and become mutually interdispersed to form composite metal particles having substantially the average composition of the starting mixture.

The product powders produced in accordance with the invention have the advantage of being non-pyrophoric, i.e., of not being subject to spontaneous combustion when exposed to air. Indeed, the product powders are sufficiently large to resist substantial surface contamination when exposed to air.

Depending upon the amount of binder metal employed, the product particles may have a size of up to about 500 microns with a particle size range of about 3 to about 50 microns being more common when the initial mixture contains a major proportion of an easily deformable binder metal.

DETAIL ASPECTS OF THE INVENTION

By employing the foregoing method for producing wrought, composite metal particles, a wide variety of sintered products can be made. The starting matrix-forming metal powders employed in producing the composite particles may range from about 3 microns to 150 microns or even up to 500 microns. The matrix-forming binding metal should not be so fine, e.g., below 2 microns, or less than 1 micron, so as to be pyrophorically active. As stated hereinbefore, the powder mixture may comprise a plurality of constituents so long as at least one is a compressively deformable metal and at least one is a hard refractory compound, such as tungsten carbide, titanium carbide, aluminum oxide, zirconium oxide, and the like. In order to produce the desired composite particle, the compressively deformable metal advantageously comprises at least about 15%, or 25%, or 50% by volume of the total powder composition. Where two or more compressively deformable metals are present, it is to be understood that these metals together should comprise at least about 15 volume percent of the total mixture.

Broadly stated, the refractory compound may be selected from the group consisting of carbides, borides, nitrides, silicides of titanium, zirconium, hafnium, chromium, tungsten, molybdenum, vanadium, columbium, tantalum, and oxides of aluminum, beryllium, the rare earth metals (such as cerium, lanthanum, yttrium, and the like), magnesium, zirconium, titanium and thorium, and also silicon carbide, among others. Aluminides and beryllides may also be employed in instances where they are stable in the matrix used. The matrix-forming binding metal may comprise at least one metal from the following groups:

(a) The iron group metals iron, nickel, cobalt, alloys of these metals with each other, and alloys of at least one iron group metal with at least one of the metals chromium, molybdenum, tungsten, columbium, tantalum, vanadium, titanium, zirconium and hafnium.

(b) A metal of the group silver, copper, and a ductile metal of the platinum group (e.g., platinum, palladium, rhodium, ruthenium, etc.).

(c) A metal of the group aluminum, zinc, lead and their alloys.

With regard to the (b) metal group listed hereinabove, the matrix-forming binding metals are particularly useful in the production of wear resistant electrical contact elements.

As illustrative of the various sintered compositions that can be produced in accordance with the invention, the following examples are given:

TABLE I

| No. | Volume percent of— | | Others |
| --- | --- | --- | --- |
| | Cobalt | WC | |
| 1 | About 15 to 25 | Balance | Up to 3 wt. percent TaC+TiC. |
| 2 | About 25 to 45 | do | Up to 2 wt. percent TaC+TiC. |
| 3 | About 15 to 20 | do | About 10-22 wt. percent TiC predominantly. |
| 4 | About 15 to 25 | do | About 18-30 wt. percent TaC. |

Composition No. 1 is particularly useful for rough cuts on cast iron. Composition No. 2 has utility in the high-impact die applications. Composition No. 3 is good for roughing cuts on steel and exhibits good shock resistance together with wear and crater resistance. This composition is also applicable for dies involving moderate impact. Composition No. 4 is useful in wear applications involving heat; gage elements and special machining applications.

Binder alloy compositions which may be used in place of cobalt are the well known superalloy compositions capable of being age hardened at temperatures of about 1200° F. to 1800° F. Such binder metals are particularly useful in resisting softening under conditions where the tungsten carbide cutting tool is used at relatively high cutting speeds which tend to overheat the cutting edge of the tool. Examples of age hardenable superalloy compositions are those falling within the following range by weight: about 4% to 65% chromium, at least about 0.5% of an age hardening element selected from the group consisting of up to about 15% aluminum, up to about 20% columbium, and up to about 25% titanium; up to about 40% molybdenum, up to about 30% tantalum, up to about 2% vanadium, up to about 15% manganese, up to about 2% carbon, up to about 1% silicon, up to about 1% boron, up to about 2% zirconium, up to about 4% hafnium, up to 0.5% magnesium, and the balance essentially at least 25% of one element from the group consisting of nickel, iron and cobalt.

Another cemented carbide having particular use as a cutting tool and for die applications is a titanium carbide composition in which finely divided titanium carbide grains are dispersed through a matrix of a nickel-molybdenum alloy. The following compositions may be employed.

TABLE II

| Number | Volume percent of— | |
|---|---|---|
| | TiC | Ni-Mo alloy |
| 5 | 85 to 50 | 15 to 50. |
| 6 | 85 to 75 | 15 to 25. |

Composition No. 6 is particularly useful for cutting tools. The composition of the nickel-molybdenum alloy itself preferably ranges by weight from about 25% to 70% molybdenum and about 75% to 30% nickel, a more advantageous range being 35% to 60% by weight of molybdenum and 65% to 40% by weight of nickel.

The use of heat resisting metal carbide compositions for high temperature applications is a relatively recent innovation. Examples of systems which have been proposed are carbides of titanium and chromium with nickel or nickel-base alloy as the binder metal. Such materials have been proposed for jet-engine components for operation from 1600° F. to 2200° F. These materials are also referred to as cermets. Such cermets, depending upon their particular use, may range broadly in composition from about 15 to 70 volume percent of binder metal and from about 85 to 30 volume percent of carbide. A preferred composition is one containing about 15 to 40 volume percent of binder metal and about 85 to 60 volume percent of carbide. The hard carbide phase is predominantly titanium carbide with chromium carbide additions. For example, part of the titanium carbide may be replaced with up to about 25 volume percent of chromium carbide.

Another type of cermet is one in which chromium carbide predominates to confer resistance to oxidation and corrosion at temperatures up to about 1800° F. The binder metal may be nickel, nickel-chromium alloy, nickel-cobalt alloy, and the like.

As illustrative of the invention, the following examples are given:

EXAMPLE I

An example of a tool composition provided by the invention is one containing about 25% by weight of cobalt and about 75% by weight of tungsten carbide, which on the volume basis corresponds to about 37 volume percent of cobalt and about 63 volume percent of tungsten carbide. A powder mixture of the foregoing composition consisting essentially of about 5 to 7 microns cobalt and about 3 to 5 microns tungsten carbide is placed in the attritor mill of the type shown in FIG. 2 containing ¼ inch hardened steel balls and dry milled at a ball-to-powder volume ratio of about 25:1 and an impeller speed of 185 r.p.m. for about 50 hours until a composite metal powder is obtained characterized by a microstructure in which the constituents are intimately united or mechanically alloyed to provide a homogeneous interdispersed. During milling, the tungsten carbide powder is reduced in size to provide a tungsten carbide dispersion in a cobalt matrix of particle size less than 1 micron uniformly distributed throughout the matrix. The cold worked wrought, composite powder is consolidated by hot pressing in a graphite die at 1350° C. for 3 minute using 500 p.s.i. pressure.

EXAMPLE II

A heat and oxidation resistant cermet composition based on a titanium carbide-nickel alloy system is produced as follows:

About 80% by volume of titanium carbide particles of about 5 to 7 microns in average size is blended with 20% by volume total of nickel and chromium proportioned to provide a binder alloy containing by weight about 80% nickel and 20% chromium. A blended charge of 1800 grams is prepared comprising 1240 grams of titanium carbide and 560 grams of nickel plus chromium (448 grams of about 4 to 8 micron carbonyl nickel and 112 grams of minus 200 mesh chromium). In determining the amounts, the density of titanium carbide is taken as 4.7 grams/cm.³ and that of the ultimate nickel-chromium alloy as 8.4 grams/cm.³. The blended 1800 gram charge is placed in the attritor mill of Example I containing a charge of one-quarter inch hardened steel balls of amount sufficient to provide a volume ratio of ball-to-powder of about 20:1. The mill is operated at about 180 r.p.m. for about 50 hours to produce wrought composite particles characterized metallographically within substantially each composite particle by an internal structure comprising said nickel-chromium and titanium carbide intimately united and dispersed. The powder is then blended with an organic binder and compressed into a compact to a density of at least about 65% of theoretical density and the compact is then subjected to sintering in high purity hydrogen, at a temperature above that corresponding to the melting point of the 80 nickel-20 chromium alloy, e.g., at a temperature of about 2650° F. The uniform dispersion of the carbide is maintained substantially throughout the finally sintered product.

EXAMPLE III

In producing a sintered electrical contact material containing 50% by weight of silver (60 volume percent) and 50% by weight (40 volume percent) of tungsten carbide, the following procedure is employed.

About 1000 grams of silver of minus 200 mesh are blended with 1000 grams of tungsten carbide powder of about 5 to 7 microns in average size. The powder blend is placed into the attritor mill as in Example I containing a charge of one-quarter inch hardened steel balls, the amount of the balls being sufficient to provide a ball-to-powder volume ratio of about 18:1. The mill is operated at about 185 r.p.m. for about 45 hours to produce wrought composite particles characterized by an internal structure in substantially each of the particles with the constituents silver and tungsten carbide intimately united and uniformly dispersed. Due to the high energy milling action, the tungsten carbide particles are reduced in size, e.g., to 1 micron or less.

The composite powder is then hot pressed into shapes for electrical contacts in a graphite die by exerting a pressure of 500 p.s.i. for three minutes at a temperature slightly above the melting point of silver, e.g., about 1800° F.

As stated hereinbefore, the binder metal employed in making electrical contacts may be selected from the group consisting of silver, copper and platinum group metals, with the refractory carbide or other hard phase ranging from about 30% by volume to about 80% by volume, e.g., about 40% to 70% by volume, with the balance the binder metal.

EXAMPLE IV

A titanium carbide composition containing a nickel-molybdenum alloy as the binder metal comprising 65% by weight of titanium carbide (79 volume percent) and 35% by weight of a 50:50 mixture of nickel-molybdenum (21 volume percent) is produced as follows:

A 2000 gram powder charge is blended by mixing 1300 grams of titanium carbide of about 5 to 7 microns in size with 350 grams of molybdenum powder of about 6 to 8 micron size and 350 grams of carbonyl nickel powder of also about 4 to 7 microns in size. The blended powder is placed in the attritor mill of Example I containing one-quarter inch diameter hadrened steel balls at a ball-to-powder ratio of about 22:1. The mill is operated dry at about 185 r.p.m. for about 48 hours to produce wrought composite particles characterized by an internal structure in substantially each of the particles with the titanium carbide grains and the constituents nickel and molybdenum intimately united and uniformly dispersed. As a result of the milling and as the composite particles go through a stage of growth, the titanium carbide is reduced in size, such as below 1 micron. The wrought composite powder which has a highly cold worked matrix is separated from the ball charge, sieved to remove occasional coarse particles, then mixed with organic binder and consolidated to the shape of a tool of density of at least about 60% or 70% true density and the tool shape then sintered in vacuum at a temperature just above that corresponding to the melting point of the 50:50 nickel-molybdenum alloy. The final shape is then ground to the shape of a cutting tool.

EXAMPLE V

In a particular instance involving the treatment of very hard powders, a charge consisting of about 50% by volume of 5 micron tugnsten powder and about 50% by volume of zirconium oxide powder having a particle size of 300 angstroms was dry milled in a high speed laboratory shaker mill for about three hours. A composite powder comprising zirconia distributed through a tungsten matrix was produced. This powder was then mixed with carbonyl nickel powder having an average particle size of about 3 to 5 microns in volume proportions of about 40% tungsten-zirconia composite and about 60% nickel. This charge was again dry milled in the high speed shaker mill for a total of two hours. Hard tungsten-zirconia powders were comminuted and distributed in the product powder as a finely dispersed phase. The resulting relatively coarse product powder contained by volume about 20% zirconia, about 20% tungsten and about 60% nickel in hierarchical relation with minimal contact between zirconia and nickel. The composite powder is then consolidated by hot pressing in a graphite die with a pressure of 700 p.s.i. at a temperature of 2700° F. for three minutes.

An advantage in using wrought composite particles in producing wrought metal products of the invention is that the interparticle spacing between constituents is fixed and predetermined leading to vastly improved and rapid homogenization by means of short-time diffusion annealing treatments. In addition, reactive components e.g., chromium and the like, are in effect neutralized by the milling technique by being incorporated into and being protected by the matrix of the host metal, e.g., iron, nickel and/or cobalt, making up an important constituent of the composite metal particle.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

I claim:

1. A consolidated sintered article of manufacture consisting essentially of a hard refractory compound in the amount of at least 24 volume percent of the total composition and a matrix-forming compressively deformable binder metal in the amount of at least 15 volume percent of the total composition, said hard refractory compound and said binder metal being finely and intimately interdispersed such that said consolidated article contains less than 10 volume percent of segregated regions exceeding 3 microns in minimum dimension.

2. A consolidated article of manufacture in accordance with claim 1 wherein said hard refractory compound comprises about 24 to about 85 volume percent thereof and is selected from the group consisting of carbides, borides, nitrides, silicides of titanium, zirconium, hafnium, chromium, tungsten, molybdenum, vanadium, columbium, tantalum, and oxides of aluminum, beryllium, rare earth metals, magnesium, zirconium, titanium and thorium, and also silicon carbide, and wherein said matrix-forming binder metal is selected from the group consisting of:

(a) the iron group metals consisting of iron, nickel and cobalt, alloys of these metals with each other and alloys of at least one iron group metal with at least one of the metals chromium, molybdenum, tungsten, columbium, tantalum and vanadium, (b) a metal of the group silver, copper and a ductile metal of the platinum group and alloys thereof, (c) a metal of the group aluminum, zinc, lead and alloys thereof.

3. A consolidated article of manufacture in accordance with claim 2 wherein said hard refractory compound is a refractory carbide, and wherein said matrix-forming binding metal is selected from the iron group metals and from alloys thereof with at least one of the metals chromium, molybdenum, tungsten, columbium, tantalum and vanadium.

4. A consolidated article of manufacture in accordance with claim 3 wherein said matrix-forming binder metal is a superalloy.

5. A consolidated article of manufacture in accordance with claim 3 wherein said hard refractory compound is tungsten carbide and said matrix-forming binder metal is cobalt in amounts ranging from about 15 volume percent to 50 volume percent.

6. A consolidated article of manufacture in accordance with claim 3 wherein said hard refractory compound is titanium carbide and wherein said matrix-forming binder metal is an alloy of nickel-molybdenum ranging from about 15 volume percent to 50 volume percent, the nickel-molybdenum alloy containing about 25% to 70% molybdenum by weight and about 75% to 30% nickel by weight.

7. A consolidated article of manufacture in accordance with claim 1 containing less than about 5 volume percent of segregated regions exceeding 2 microns in minimum dimension.

8. A consolidated article of manufacture in accordance with claim 1 containing less than about 5 volume percent of segregated regions exceeding 1 micron in minimum dimension.

References Cited

UNITED STATES PATENTS

| | | | |
|---|---|---|---|
| 3,070,440 | 12/1962 | Grant | 75—266 X |
| 3,249,407 | 5/1966 | Alexander | 29—182.5 X |
| 3,379,523 | 4/1968 | Das Chadlker | 75—206 |
| 3,388,010 | 6/1968 | Stuart | 75—226 X |
| 3,459,546 | 8/1969 | Lambert | 75—206 X |
| 3,494,807 | 2/1970 | Stuart | 75—206 X |

BENJAMIN R. PADGETT, Primary Examiner

R. E. SCHAFER, Assistant Examiner

U.S. Cl. X. R.

29—182.5; 75—206, 202, 204, 205